(12) United States Patent
Pyritz

(10) Patent No.: US 6,173,244 B1
(45) Date of Patent: Jan. 9, 2001

(54) SYSTEM AND METHOD FOR TESTING A SWITCHING SYSTEM IN A TELECOMMUNICATION NETWORK

(75) Inventor: William H. Pyritz, Naperville, IL (US)

(73) Assignee: Lucent Technologies, Inc., Murray Hill, NJ (US)

(*) Notice: Under 35 U.S.C. 154(b), the term of this patent shall be extended for 0 days.

(21) Appl. No.: 09/057,715

(22) Filed: Apr. 9, 1998

(51) Int. Cl.[7] .................................................... G06F 9/455
(52) U.S. Cl. ............................................................ 703/20
(58) Field of Search .................................. 379/29, 27, 15, 379/219; 395/500.41, 500.42, 500.44, 500.45, 500.46

(56) References Cited

U.S. PATENT DOCUMENTS

| | | | |
|---|---|---|---|
| 4,438,298 | * | 3/1984 | Rubin ....................................... 379/29 |
| 5,359,646 | * | 10/1994 | Johnson et al. .......................... 379/27 |
| 5,390,232 | * | 2/1995 | Freeman et al. ......................... 379/15 |
| 5,644,919 | * | 7/1997 | Farris et al. .............................. 379/27 |
| 5,870,464 | * | 2/1999 | Brewster et al. ...................... 379/219 |
| 5,881,131 | * | 3/1999 | Farris et al. .............................. 379/27 |

OTHER PUBLICATIONS

Oka, Transmission Line Simulation for Testing ISDN Devices, May 1989, pp. 87–94.*

* cited by examiner

Primary Examiner—Kevin J. Teska
Assistant Examiner—Dan Fiul

(57) ABSTRACT

A test system in a communication system provides for a simulation of a test telephone call to a switching system under test. A test controller is integrated with the system under test for simulating the telephone call to the system under test. A high speed interface card with a processor is interfaced with the computer on the system under test through a computer bus interface for gathering call processing event data, A high speed interface communicates with the test controller to convey the simulated call processing event data to the controller computer.

16 Claims, 5 Drawing Sheets

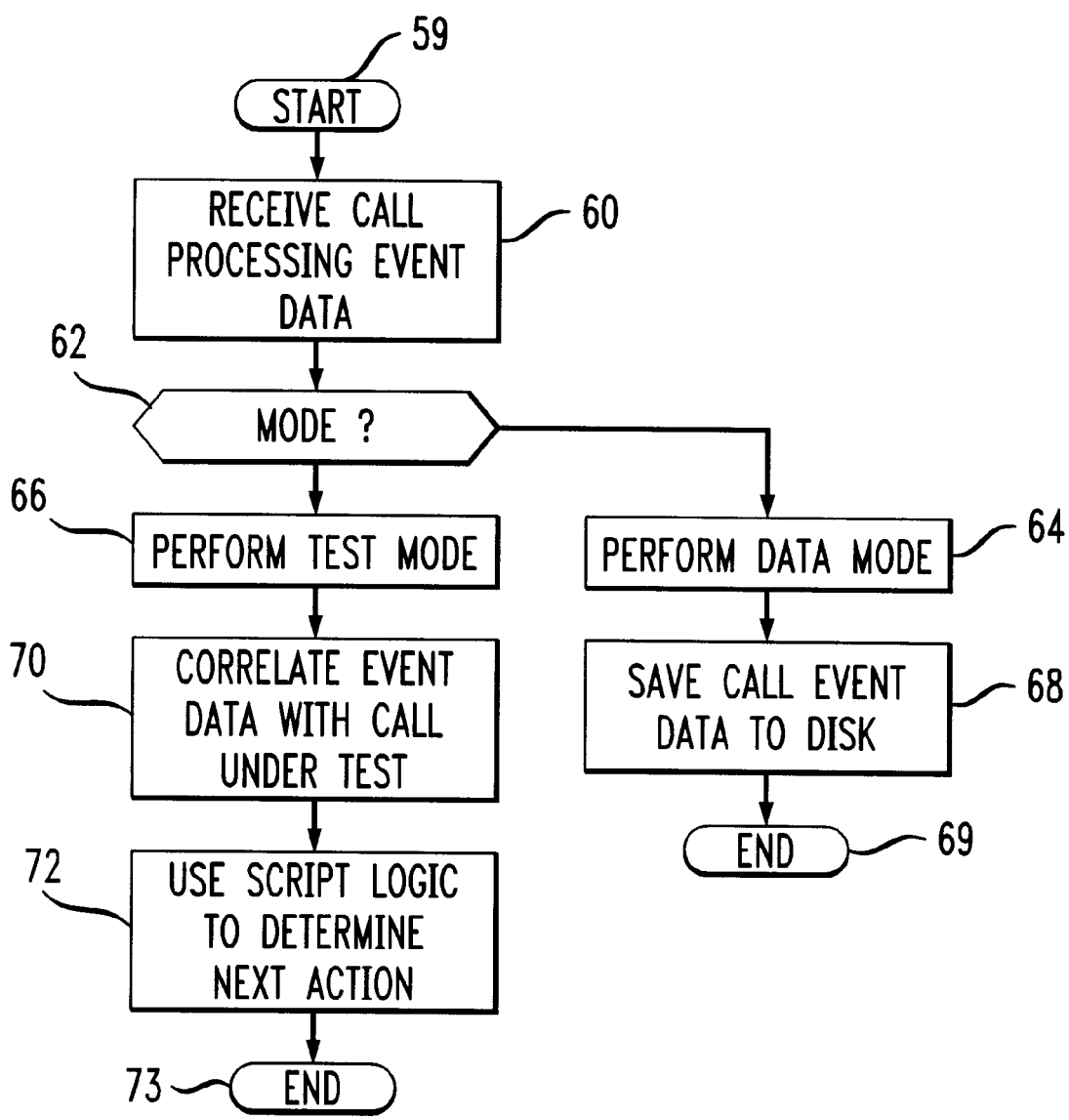

SYSTEM AND METHOD FOR TESTING A SWITCHING SYSTEM IN A TELECOMMUNICATION NETWORK

BACKGROUND OF THE INVENTION

The present invention relates generally to telecommunication systems and particularly to systems and methods for testing telecommunication systems.

Current telecommunication systems are composed of large networks with system topologies having a multitude of processors at the central offices, switches, and adjunct systems of the networks. Within these network system topologies, a central office maintains control over a network area of a telecommunication system. Within the network area, there are numerous switches that process incoming and outgoing calls. These switches are located at both the central office and in the field, physically outside the central office boundaries. All of the switches are part of the network area controlled by the central office. An example of such a switch is included in an adjunct system, which is located within or outside of a central office and contains a processor and the necessary components to process a call. An adjunct system assists a corresponding switch by assuming some of the processing duty of the switch.

As communications systems continue to grow worldwide so does the need to test and analyze adjunct systems and switches associated with the development and maintenance of the communication systems. There are practical problems associated with testing and analyzing adjunct systems and switches. For example, present methods and tools for testing and analyzing adjunct systems and switches do not provide the comprehensive data or the needed access to the adjunct systems and switches. Furthermore, adjunct systems and switches are developed in a closed environment and built in an isolated network system topology with limited access to the internal functional components of the adjunct systems and switches. As a result, detailed knowledge of the hardware and software states is not directly available to those who perform the testing and analysis.

Because current test methods and tools are not integrated with the adjunct systems and switches, test systems need to be sophisticated, and in some cases more sophisticated than the adjunct systems and switches under test. Additionally, developers are frequently required to send special software and hardware equipment and products to a field site to gather essential information to perform a desired test. In view of the foregoing, the present methods and tools do not provide an adequate means for performing testing of adjunct systems and switches in real time.

Therefore, there is a need in telecommunication systems for a system and method that is integrated with adjunct systems and switches for performing in real time testing of the adjunct systems and switches.

SUMMARY OF THE INVENTION

This need is met by the system and method in accordance with the invention wherein the system and method for testing is integrated with a test system.

Another aspect of the invention provides for simulating a test telephone call to one of a plurality of switch systems selected to be under test and gathering simulated call processing event data associated with processing of a simulated test telephone call by the system under test for testing analysis. The provision for simulation includes another one of the plurality of switch systems of the telecommunication network and a test controller. The test controller controls the other one of the switch systems to simulate a telephone call to the system under test and includes communicating with the other switch system to cause the other switch system to react the same as if an actual call had entered the other switch system for forwarding through the system under test.

A further aspect of the invention provides for monitoring actual telephone calls being processed by the system under test and storing actual call processing event data associated with the actual telephone calls being monitored. The simulation includes a test controller for correlating the simulated call processing event data with the actual call processing event data to determine the nature of a call failure.

In yet another aspect of the invention the simulation is part of a test controller that includes a controller processor for analyzing the simulated call processing event data and the gathering of simulated call processing event data includes a relatively high speed interface card with a processor interfaced with the computer of the system under test through a computer bus interface for gathering the simulated call processing event data on a real time basis. A relatively high speed interface communicates with the test controller to convey the simulated call processing event data to the controller computer on a real time basis.

These and other features and advantages of the present invention will become apparent from the following detailed description, the accompanying drawings and the appended claims.

BRIEF DESCRIPTION OF THE DRAWINGS

The advantages of this invention will become apparent upon reading the following detailed description and upon reference to the drawings in which:

FIG. 6 is a flow diagram illustrating the steps performed during the processing of a call event.

DETAILED DESCRIPTION

Figure 1:
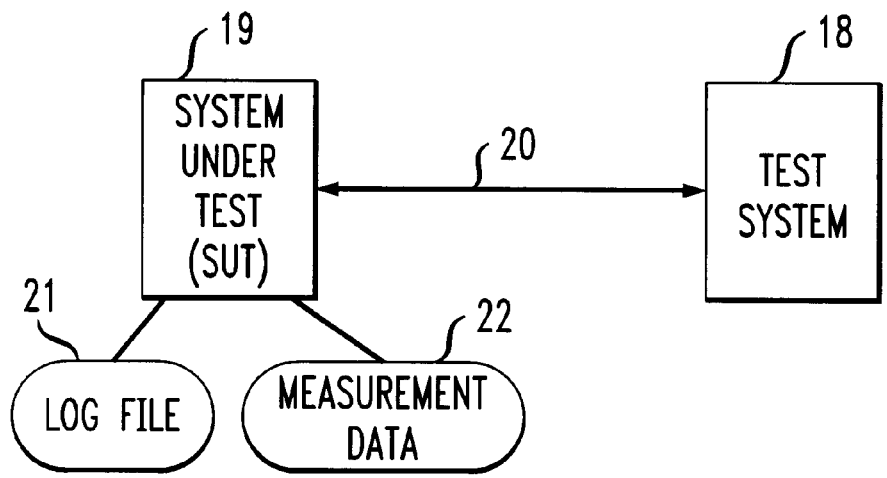
FIG. 1 is a functional block diagram showing a prior art system of testing of a system under test.

Turning now to the drawings and referring initially to FIG. 1, a functional block diagram is shown for the prior art of non-integrated system for testing an adjunct system or switch in a telecommunication system. A test system 18 is connected to a system under test (SUT) 19 through a test connection 20. The SUT 19 is either an adjunct system or switch. The test system 18 includes a computer system for generating data for the test system 18.

The SUT 19 includes hardware that creates a log file 21 and measurement data 22 which in combination with the test system 18 is used by test personnel to monitor the operation of the SUT 19. However, the information from the log file 21 and measurement data 22 only gives the test personnel a limited idea of what is happening in the SUT 19 because the test system 18 is not integrated into the SUT 19.

Figure 2:
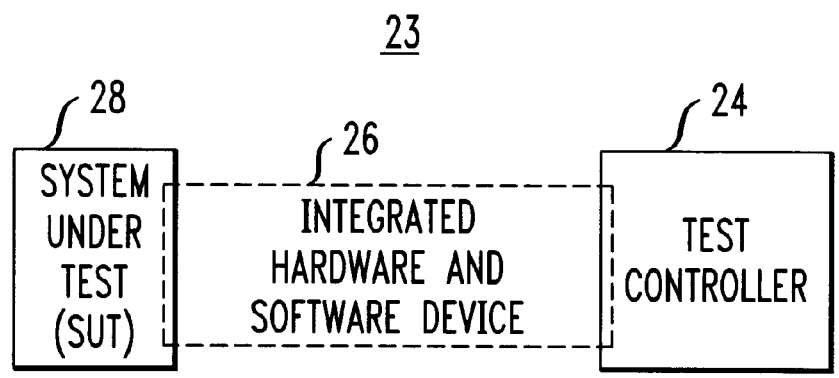
FIG. 2 is a functional block diagram of test system of the present invention interfaced with a system under test.

As a solution to the problem posed by the non-integration of FIG. 1, FIG. 2 shows a functional block diagram of a test system 23 in accordance for the present invention. As shown in FIG. 2, the test system 23 includes a test controller 24 and an integrated hardware and software device (IHSD) 30 is shown integrated into both the test controller 24 and a system under test (SUT) 28. The IHSD 26 allows components of the SUT 28 to be accessible at the architectural stage to the test system 23. Thus, the process of testing and analyzing the SUT 28 is automatic, comprehensive and complete at the test system 23.

Figure 3:
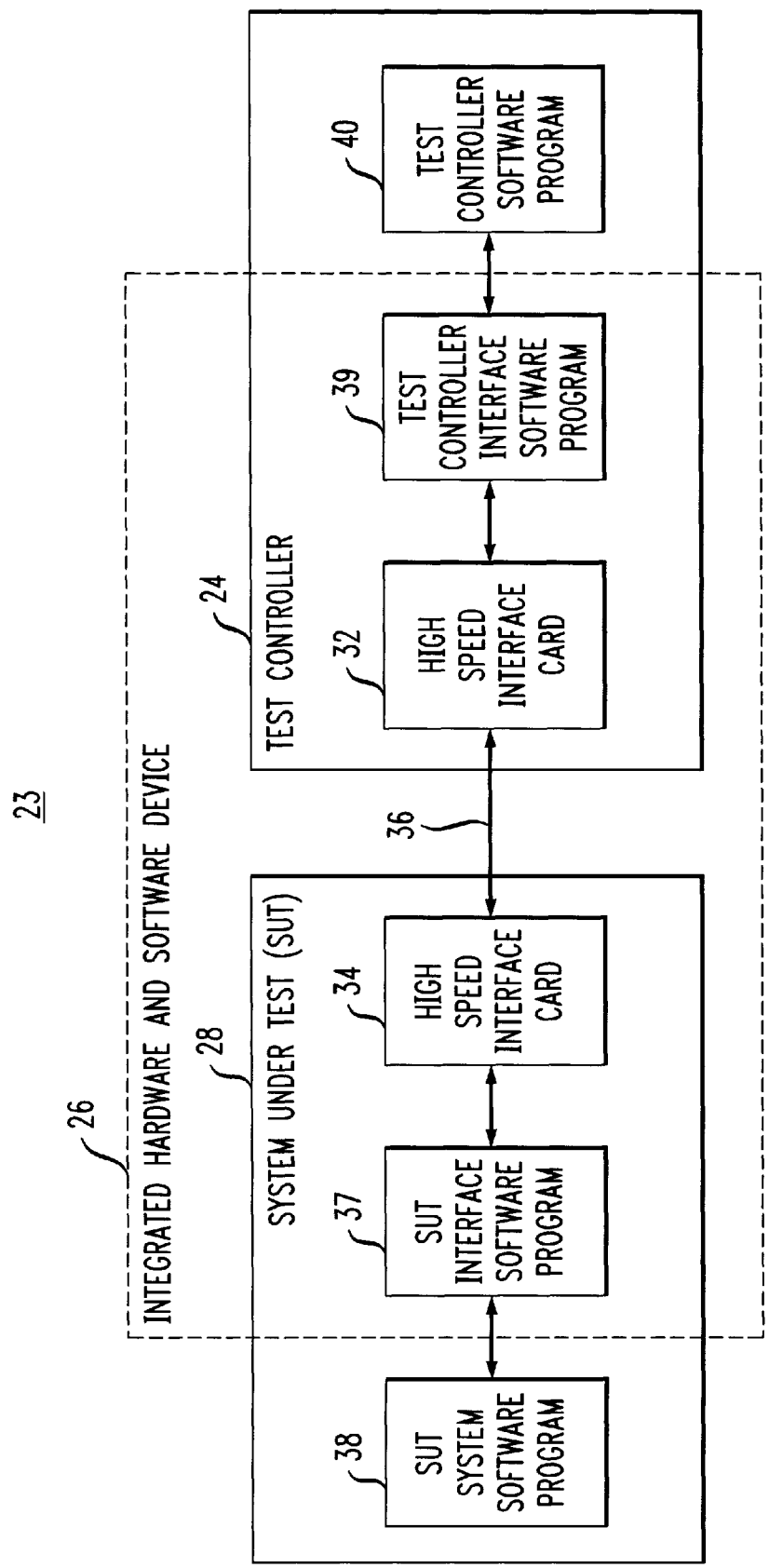
FIG. 3 is a more detailed functional block diagram of the test system of the present invention interfaced with a system under.

FIG. 3 shows a more detailed functional block diagram for the test system 23. The IHSD 26 includes high-speed interface cards 32 and 34 connected through a high-speed interface connection 36. Preferably, both high-speed interface cards 32 and 34 are identical and are circuit boards for selective insertion and removal.

The high-speed interface card 34 is located inside the SUT 28 and is controlled by the SUT interface software program 37. The high-speed interface card 32 is located inside the test controller 24 and is controlled by the test controller interface software program 39.

The SUT interface software program 37 is part of the IHSD 26 and is designed to allow the high-speed interface card 34 to communicate with the SUT 28 through the SUT system software program 38. The test controller interface software program 39 is part of the IHSD 26 and is designed to allow the high-speed interface card 32 to communicate with the test controller 24 through the test controller software program 40.

Both the SUT interface software program 37 and the test controller interface software 39 enable the SUT system software program 38 and the test controller software program 40 to access the functions resident on the high speed interface cards 32 and 34. These resident functions allow the high speed interface cards 32 and 34 to control the posting and receiving of call events.

Figure 4:
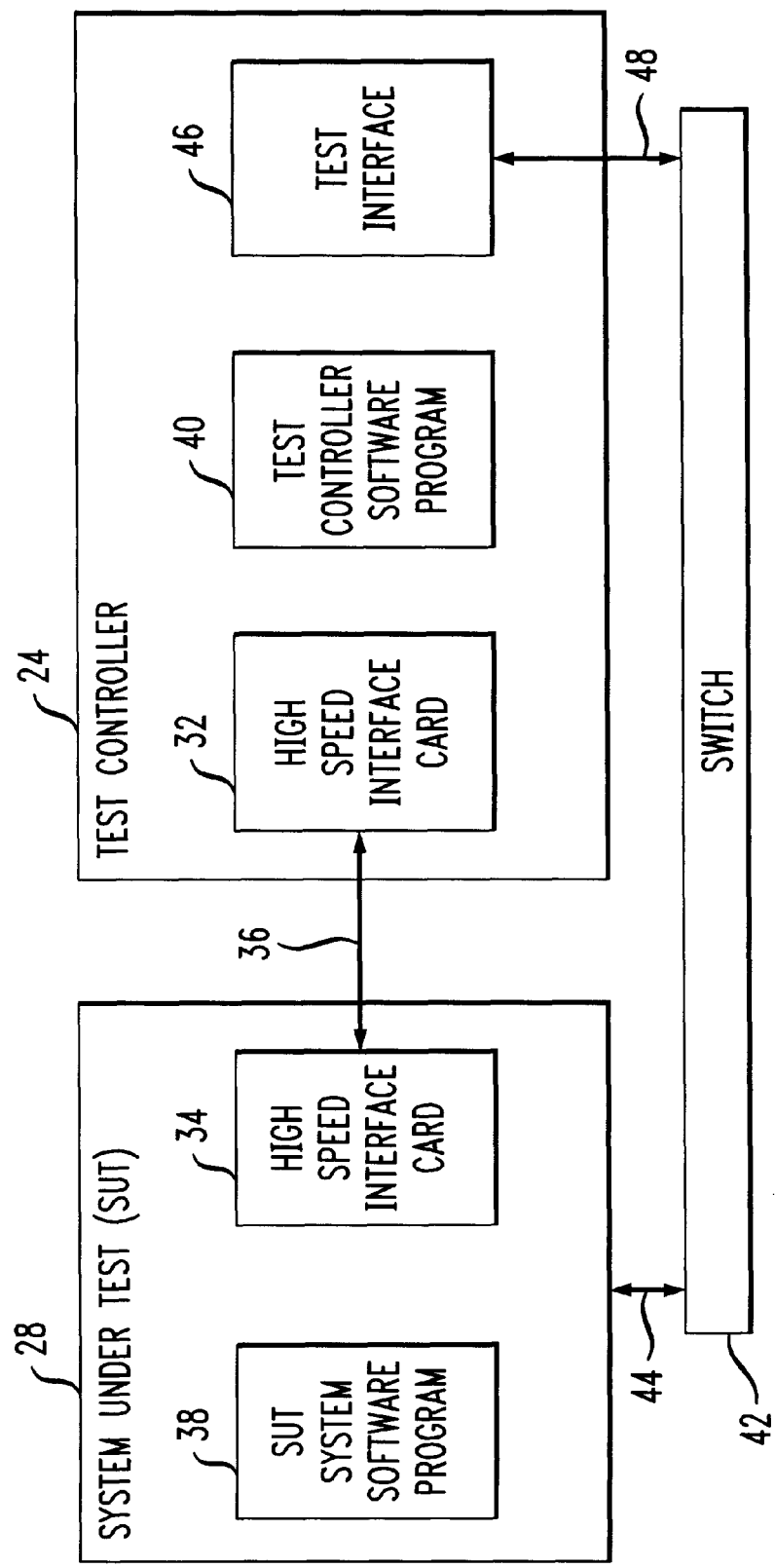
FIG. 4 is a functional block diagram of the test system of the present invention interfaced with and a switch.

FIG. 4 is a functional block diagram of the present invention in conjunction with the test controller 24, SUT 28, and a switch 42. The switch 42 is either a switch from the network area of the telecommunication system and located in either the central office or the field) or a test switch used in a laboratory for simulation purposes. The switch 42 is connected to the SUT 28 through connection 44 and the test controller 24 through a test interface 46.

In FIG. 4, the switch 42 is used to facilitate the simulation of a call generated by the test controller 24. Accordingly, the switch 42 enables the test controller 24 to test the SUT 28. In a test mode, the test controller 24 interacts with the switch 42 as if an actual call is being made. The test interface 46 interfaces with the switch 42 such that the switch 42 reacts as if an actual call has entered the switch 42. The resulting information processed by the switch 42 is then passed to the SUT 28 through connection 44.

In the operation of the test system 23, the test controller 24 originates a call on the test interface 46. Then, using event data from the SUT 28, the test controller 24 executes a call logic script that progresses the call through its various stages to the events re-posted by the SUT 28. An example of a logic script is described later in this application.

This allows the test system 23 to determine the exact state and the respective data for all predefined call stages. In this way the test system 23 has comprehensive, and complete information verifying the proper functioning of the SUT 28. Thus, this allows the system 20 to identify a call success from a call failure so that enough information is accumulated to understand the nature of a call failure so that the cause of the failure can be corrected.

In addition, in the event of failure of the SUT 28, the test system 23 provides the data necessary to characterize the failure of the SUT 28 and identify the cause of the failure. More specifically, in the event of a failure of the SUT 28, the test system 23 provides the data necessary to characterize the failure of the SUT 28 and identify the cause of the failure because the test system 23 is connected via the high speed interface cards 32 and 34 to the SUT 28 at a hardware level. Because of the limited information available in prior art testing identifying the cause of the event failure when the SUT 28 is under a call load is very difficult to achieve.

The implementation of this invention is the same if the SUT 28 is either an adjunct system or a switch. When the SUT 28 is an adjunct system, the test system 23 simulates a condition where the switch 42 is off loading some of its call processing to the adjunct system. When the SUT 28 is a switch, the test system 23 is simulating the processing of a call by multiple switches. In this later case, the switch is used as the SUT 28 and is made to react to a simulated call on the switch 42.

Figure 5:
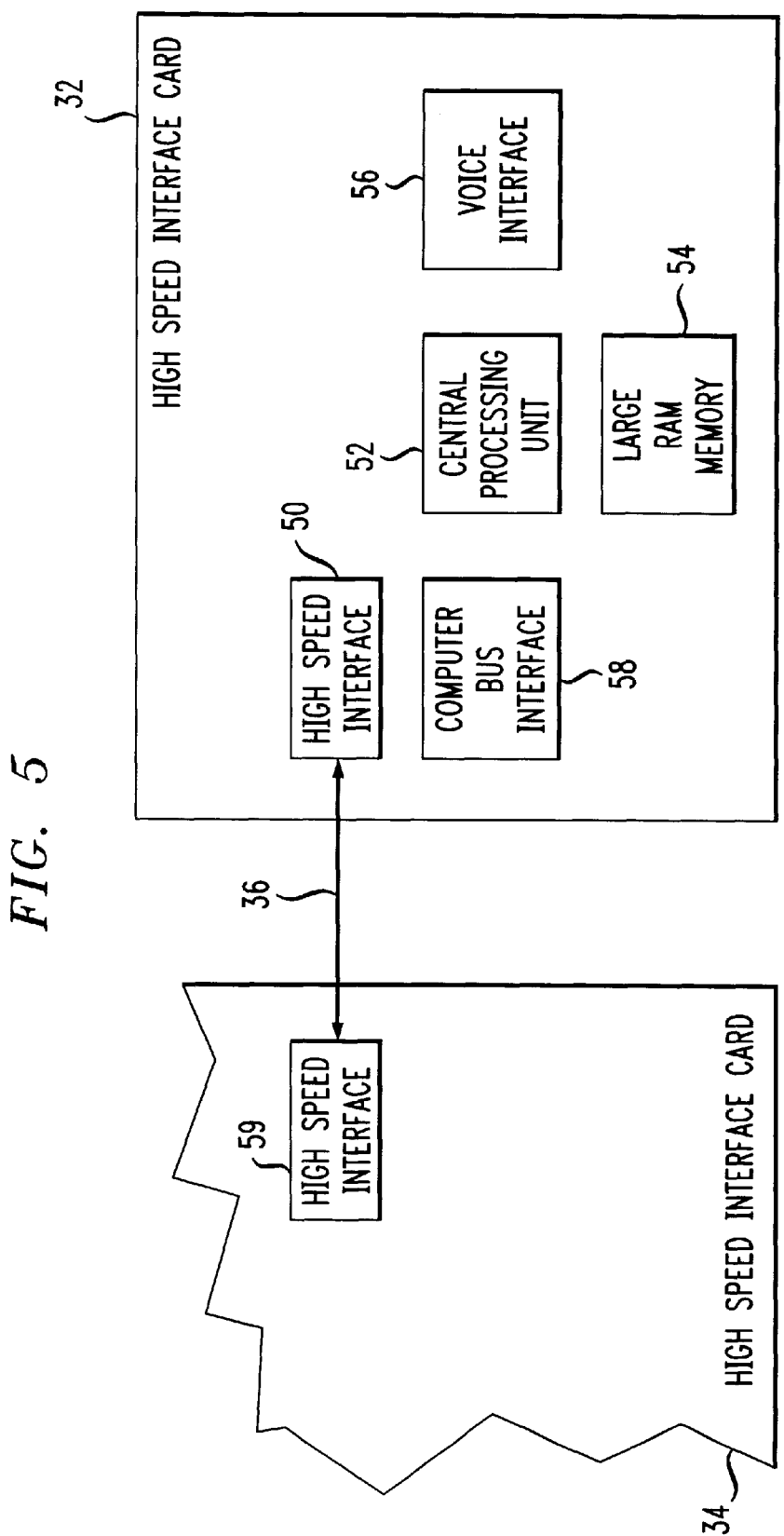
FIG. 5 is block diagram of a high speed interface card.

FIG. 5 shows a block diagram for the high-speed interface card 32, which is a card that plugs into the test system 23. The high-speed interface card 32 has a central processing unit (CPU) 52, a high-speed interface 50, a large storage device such as random access memory (RAM) 54, a voice interface 56, and a computer BUS interface 58.

The high-speed interface 50 is connected to a high-speed interface 59 of the high-speed interface card 34 in the SUT 28 through the high-speed interface connection 36. It allows the data obtained from the SUT 28 to be accessed by the CPU 52 and stored in a large RAM 54 for processing.

Once the CPU 52 has completed its processing of the data stored in RAM 54, the CPU 52 sends the processed data to the test system 23 through the high speed interface 50. The voice interface 56 is used to extract any voice data required or other digital type of communication from the SUT 28 for the test controller 24. The computer BUS interface 58 is used to give the computer system in the test controller 24 control over the high-speed interface card 32 through the test system software program 40 and transmit SUT 28 calls to the high speed interface card 32.

FIG. 6 shows a flow diagram of a method for the operation of the present invention. The method starts at step 59. Then, in the first step 60, the SUT 28 receives a call. The data from this call is defined as call processing event data. The test system 23 then determines, in step 62, if the SUT 28 is in a data mode 64 or a test mode 66. If the test system 23 is in a data mode at step 64, the test system 23 acts in a passive manner monitoring actual calls. In step 68 the data from these call processing events is saved in a storage device (such as a large hard disk) on the test system 23, and the method ends at step 69.

If instead, the test system 23 is in a test mode at step 66, the test controller 24 simulates a call, the resulting call processing event data is then correlated, in step 70, with previous call processing event data. In step 72, the test controller 24 uses script logic software to determine the next action for the test controller 24, and the method ends at step 73.

Step 72 is accomplished with a script logic software program that has knowledge of a call scenario and all its call states and insures that the call progresses through its call states such that the call completed the call scenario successfully. A call scenario describes the many call states or steps that a call goes through in a telecommunication system. As an example of the steps or call states of a scenario of a call from an outgoing call from a calling telecommunication station to called telecommunication station: 1) the calling telecommunication station goes off hook; 2) the telecommunication system recognizes the off hook status; 3) a tone is entered at the calling telecommunication station corresponding to the identification number of the called telecommunication station; 4) the telecommunication station converts the tone to a digital data signal; 5) the telecommunication station associates the digital data signal with the identification number of the called telecommunication station; 6) the telecommunication system connects the calling telecommunication station with the called telecommunication station; 7) the called station responds to the call of the calling telecommunication station; 8) communication between the calling telecommunication station and the called telecommunication station occurs; and 9) the connection is terminated by either the calling telecommunication station or called telecommunication system going off hook.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention and are thus within its spirit and scope.

What is claimed is:

1. In a telecommunication network having a plurality of computer controlled call processing switch systems, the improvement being a testing system, comprising:

means for simulating a test telephone call to one of the plurality of switch systems selected to be under test;

means integrated with the system under test for gathering simulated call processing event data associated with processing of a simulated test telephone call from the simulating means by the system under test for testing analysis;

means for correlating the call processing event data with previous call event data;

a test controller, included in the simulating means for, for executing a call logic scenario script that progresses a simulated call through a plurality of logical stages; and means for determining a functional state of the system under test at each of the plurality of logical stages.

2. The testing system of claim 1 in which the simulating means includes another one of the plurality of switch systems of the telecommunication network, and a test controller for controlling the other one of the switch systems to simulate a telephone call to the system under test.

3. The testing system of claim 2 in which the test controller includes means for communicating with the other switch system to cause the other switch system to react the same as if an actual call had entered the other switch system for forwarding through the system under test.

4. The testing system of claim 1 in which the integrated means includes means for monitoring actual telephone calls being processed by the system under test, and storing actual call processing event data associated with the actual telephone calls being monitored.

5. The testing system of claim 4 in which the simulating means includes a test controller for correlating the simulated call processing event data with the actual call processing event data to determine the nature of a call failure.

6. The testing system of claim 1 in which the simulating means is part of a test controller that includes a controller processor for analyzing the simulated call processing event data, and the gathering means includes a relatively high speed interface card with a processor interfaced with the computer of the system under test through a computer bus interface for gathering the simulated call processing event data on a real time basis, and a high speed interface for communicating with the test controller to convey the simulated call processing event data to the controller computer on a real time basis.

7. The testing system of claim 6 in which the test controller includes a controller high speed interface card substantially the same as the same as the high speed interface card of the integrated means.

8. The testing system of claim 1 in which the test controller includes means responsive to the call processing event data to determine the cause of a call failure.

9. The testing system of claim 1 in which the switching system under test is an adjunct call processing system for handling overload call processing functions from an associated primary call processing switch.

10. The testing system of claim 8 in which the simulating means includes simulating a test telephone call another one of the plurality of switch systems of the telecommunication network, and a test controller for controlling the other one of the switch systems to simulate off loading of some call processing functions to the adjunct system under test.

11. In a telecommunication network having a plurality of computer controlled call processing switch systems at least one of which includes a telephonic switch in association with an adjunct telephonic call processor for selectively performing some call processing functions otherwise performed by the telephonic switch and transferred to the adjunct call processing system pursuant to transfer instructions received from the telephonic switch, the improvement being a testing system, comprising:

means for simulating to the adjunct call processing system transfer instructions from the associated telephonic switch; means integrated with the adjunct call processing system for gathering simulated call processing event data associated with off loading of call processing functions to the at least one adjunct call processing system when under test;

means for correlating the simulated call processing event data with previous call event data;

a test controller, included in the simulating means for, for executing a call logic scenario script that progresses a simulated call through a plurality of logical stages; and means for determining a functional state of the system under test at each of the plurality of logical stages.

12. The testing system of claim 11 in which the simulating means includes another one of the plurality of switch systems of the telecommunications network, and a test controller for controlling the other one of the switch systems to simulate the adjunct call transfer instructions to the adjunct call processing system.

13. In a telecommunication network having a plurality of computer controlled call processing switch systems, a testing method, comprising the steps of:
- simulating a test telephone call to one of the plurality of switch systems selected to be under test;
- gathering simulated call processing event data associated with processing of transfer instructions from the simulating means by the adjunct call processing system when under test for testing analysis;
- correlating the simulated call processing event data with previous call event data;
- executing call logic scenario script that progesses a simulated call through a plurality of logical stages; and
- determining a functional state of the system under test at each of the plurality of logical stages.

14. The testing system of claim 13 in which the step of simulating includes the steps of
- interfacing another one of the plurality of switch systems of the telecommunication network with the adjunct call processing system, and
- controlling the other one of the switch systems to simulate transfer of call processing functions to the adjunct call processing system.

15. In a telecommunication network having a plurality of computer controlled call processing switch systems at least one of which includes a telephonic switch in association with an adjunct telephonic call processor for selectively performing some call processing funtions otherwise performed by the telephonic switch and transferred to the adjunct call processing system pursuant to transfer instructions received from the telephonic switch, a testing method comprising the steps of:
- simulating to the adjunct call processing system transfer instructions from the associated telephonic switch;
- Gathering simulated call processing data associated with off loading of call processing functions to the at least one adjunct call processing system when under test through means integrated wit the at least one adjunct call processing system;
- correlating the simulated call processing event data with previous call event data;
- executing a call logic scenario script that progresses a simulated call through a plurality of logical stages; and
- determining a functional state of the system under test at each of the plurality of logical stages In a telecommunication network having a plurality of computer controlled call processing switch systems, a testing method, comprising the steps of:
- simulating a test telephone call to one of the plurality of switch systems selected to be under test; and
- gathering simulated call processing event data associated with processing of transfer instructions from the simulating means by the adjunct call processing system when under test for testing analysis.

16. The testing system of claim 15 in which the step of simulating means includes the steps of
- interfacing another one of the plurality of switch systems of the telecommunications network with the adjunct call processing system, and
- controlling the other one of the switch systems to simulate the adjunct call transfer instructions to the adjunct call processing system.

* * * * *